United States Patent
Verma et al.

(10) Patent No.: US 11,351,455 B2
(45) Date of Patent: Jun. 7, 2022

(54) REAL TIME INTERCONNECTED GAME CONTEXT AND DATA SHARING PLUGIN FRAMEWORK

(71) Applicant: Microsoft Technology Licensing, LLC, Redmond, WA (US)

(72) Inventors: Arunabh Verma, Seattle, WA (US); Eric S. Hamilton, Bothell, WA (US); Kripal Kavi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 16/917,446

(22) Filed: Jun. 30, 2020

(65) Prior Publication Data

US 2021/0402300 A1 Dec. 30, 2021

(51) Int. Cl.
*A63F 13/53* (2014.01)
*A63F 13/77* (2014.01)
(Continued)

(52) U.S. Cl.
CPC ........... *A63F 13/53* (2014.09); *A63F 13/77* (2014.09); *G06F 9/44526* (2013.01);
(Continued)

(58) Field of Classification Search
CPC ...... A63F 13/53; A63F 13/77; G06F 9/44526; G06F 9/542
See application file for complete search history.

(56) References Cited

U.S. PATENT DOCUMENTS

| 9,329,755 | B2 | 5/2016 | Patel |
| 2012/0209668 | A1 | 8/2012 | Angelos et al. |

(Continued)

FOREIGN PATENT DOCUMENTS

| CN | 110368695 A | 10/2019 |
| CN | 110830735 | 2/2020 |
| KR | 101273342 | 6/2013 |

OTHER PUBLICATIONS

"International Search Report and Written Opinion Issued PCT Application No. PCT/US2021/028039", dated Jul. 30, 2021, 13 Pages.

(Continued)

*Primary Examiner* — Jay Trent Liddle
(74) *Attorney, Agent, or Firm* — Rainier Patents, P.S.

(57) ABSTRACT

Systems, methods, and apparatuses are provided for interconnecting plugins of a content overlay engine that is executed with a video game. In an example system, a data manager that includes a plugin manager and an event reporting orchestrator is executed concurrently with the video game. The plugin manager identifies a set of plugins that includes at least a consumer plugin and a producer plugin coupled to the data manager. The plugin manager also identifies an event type that is to be reported to the consumer plugin. The event reporting orchestrator receives a notification of a first event from the producer plugin during execution of the video game, and determines if the first event is of the event type to be reported to the consumer plugin. If the first event is of the event type, information associated with the first event is reported to the consumer plugin.

20 Claims, 5 Drawing Sheets

(51) Int. Cl.
  *G06F 9/445* (2018.01)
  *G06F 9/54* (2006.01)
  *A63F 13/35* (2014.01)
(52) U.S. Cl.
  CPC .............. *G06F 9/541* (2013.01); *G06F 9/542* (2013.01); *A63F 13/35* (2014.09); *A63F 2300/209* (2013.01); *A63F 2300/303* (2013.01)

(56) References Cited

U.S. PATENT DOCUMENTS

| | | | |
|---|---|---|---|
| 2013/0268393 A1 | 10/2013 | Haze et al. | |
| 2014/0129682 A1* | 5/2014 | Lin | H04W 4/60 709/219 |
| 2014/0304295 A1 | 10/2014 | Eriksson et al. | |
| 2014/0370990 A1* | 12/2014 | Pu | A63F 13/69 463/42 |
| 2015/0347104 A1* | 12/2015 | Goossens | G06F 9/44526 717/151 |
| 2018/0104588 A1* | 4/2018 | Zhang | G06F 9/44526 |
| 2019/0066530 A1* | 2/2019 | Lee | G06N 3/006 |
| 2019/0272560 A1 | 9/2019 | Shin et al. | |
| 2020/0306637 A1* | 10/2020 | Baldwin | A63F 13/35 |

OTHER PUBLICATIONS

"Instant Games SDK", Retrieved from: https://web.archive.org/web/20190903211606/https://developers.facebook.com/docs/games/instant-games/sdk/, Sep. 3, 2019, 10 Pages.

"Social Sharing Plugin", Retrieved from: https://web.archive.org/web/20200102215830/https://support.brightcove.com/social-sharing-plugin, Jan. 2, 2020, 16 Pages.

Eastin, et al., "Contextual Advertising in Games: Impacts of Game Context on a Player's Memory and Evaluation of Brands in Video Games", In Journal of Journal of Marketing Communications, vol. 23, Issue 6, Apr. 6, 2016, pp. 614-631.

Miracle, Rob, "GameAnalytics plugin—Analytics for Mobile Games", Retrieved from: https://coronalabs.com/blog/2016/10/26/new-game-analytics-plugin-for-corona-sdk/, Oct. 26, 2016, 5 Pages.

Tester, Jason, "All the World's A Game: The Future of Context-Aware Gaming", Retrieved from: https://www.iftf.org/uploads/media/SR-997_Context_Aware_Gaming.pdf, May 2006, 36 Pages.

* cited by examiner

400

402 — Receiving a notification of a first event from a game context engine or a system context engine during execution of a video game

502 — Receive, during a boot-up procedure of the data manager, an event definition from the consumer plugin that defines at least the event type and a reporting schema of the event type

602 — Identify a second event type to be reported to a producer-consumer plugin

604 — Receive a notification of a second event from a second producer plugin during execution of a video game 606 — Determine if the second event is of the second event type 608 — In response to a determination that the second event is of the second event type, provide information associated with the second event to the producer-consumer plugin

FIG. 6

REAL TIME INTERCONNECTED GAME CONTEXT AND DATA SHARING PLUGIN FRAMEWORK

BACKGROUND

Recent advances in gaming systems have enabled supplemental content to be provided to users while playing a video game. For instance, gaming systems can provide a wide variety of dynamic and interactive content that is overlaid on, or otherwise presented concurrently with, the output of a currently executing video game. Such supplemental content may be provided to a gaming system in various ways, such as from one or more plugins or widgets that are executed along with a gaming overlay application. However, these plugins typically have limited access to real-time information originating from the gaming system, thereby reducing the functionalities offered by these plugins. In addition, in instances where such access may exist, the access is typically the result of the plugin being integrated into the video game itself, which can not only lead to a breach of the underlying video game operations but also hinder performance of the gameplay of the video game.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and computer program products are provided for interconnecting plugins of a content overlay engine that is executed with a video game. In an example system, a data manager that includes a plugin manager and an event reporting orchestrator is executed concurrently with the video game. The plugin manager identifies a set of plugins that includes at least a consumer plugin and a producer plugin coupled to the data manager. The plugin manager also identifies an event type that is to be reported to the consumer plugin. The event reporting orchestrator receives a notification of a first event from the producer plugin during execution of the video game, and determines if the first event is of the event type to be reported to the consumer plugin. If the first event is of the event type, information associated with the first event is reported to the consumer plugin. In this manner, a data manager executed concurrently with a video game may enable sharing of information across different plugins that are connected thereto.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the embodiments and to enable a person skilled in the pertinent art to make and use the example embodiments.

FIG. 4 shows a flowchart of a method for receiving a notification of an event from a game context engine or a system context engine, according to an example embodiment.

FIG. 5 shows a flowchart of a method for receiving an event definition from a consumer plugin, according to an example embodiment.

FIG. 6 shows a flowchart of a method for providing event information to a producer-consumer plugin, according to an example embodiment.

Figure 1:
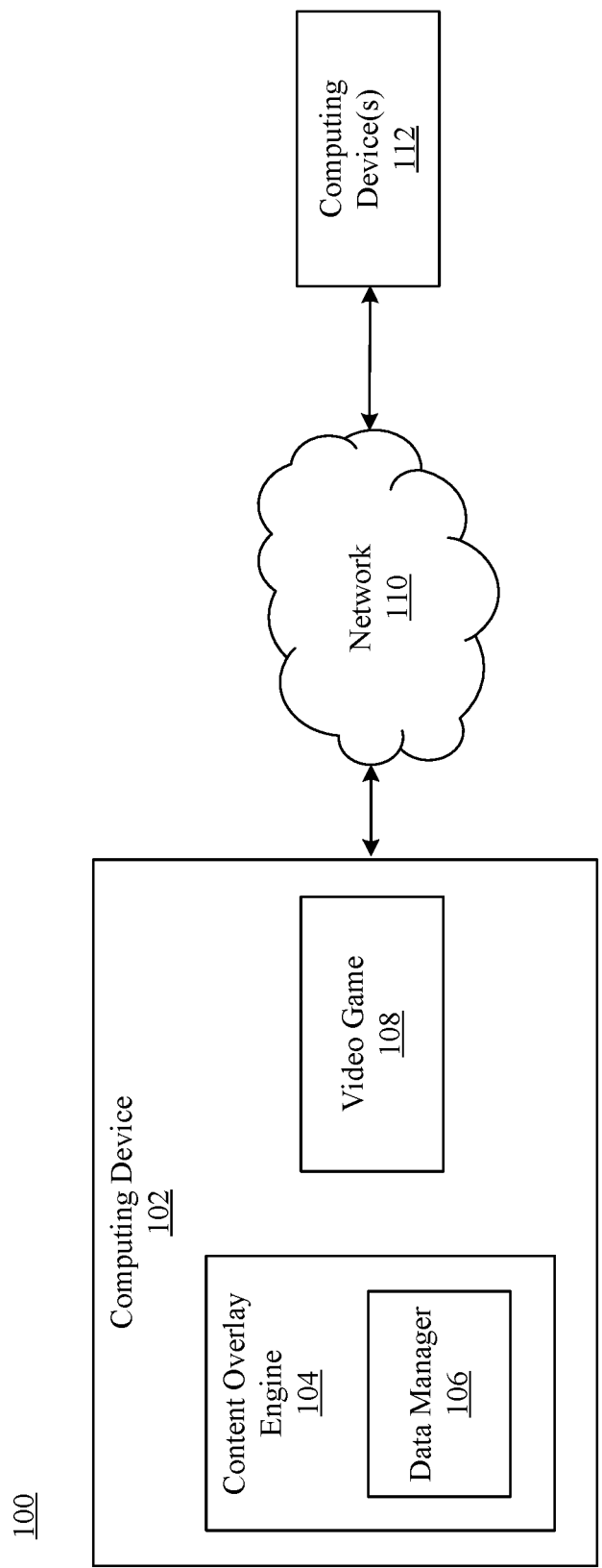
FIG. 1 shows a block diagram of a system for managing data in a content overlay engine, according to an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, are understood to mean that the condition or characteristic is defined to within tolerances that are acceptable for operation of the implementation for an application for which it is intended.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Recent advances in gaming systems have enabled supplemental content to be provided to users while playing a video game. For instance, gaming systems can provide a wide variety of dynamic and interactive content that is overlaid on, or otherwise presented concurrently with, the output of a currently executing video game. Such supplemental content may be provided to a gaming system in various ways, such as from one or more plugins or widgets that are executed along with a gaming overlay application. However, these plugins typically have limited access to real-time information originating from the gaming system, thereby reducing the functionalities offered by these plugins. In addition, in instance where such access may exist, the access is typically the result of the plugin being integrated into the video game itself, which can not only lead to a breach of the underlying video game operations, but also hinder performance of the game play of the video game.

Implementations described herein address these and other issues through a system for interconnecting plugins of a content overlay engine that is executed with a video game. In an example system, a data manager is executed concurrently with a video game that includes a plugin manager and an event reporting orchestrator. The plugin manager identifies a set of plugins that includes at least a consumer plugin and a producer plugin coupled to the data manager. The plugin manager also identifies an event type that is to be reported to the consumer plugin. The event reporting orchestrator receives a notification of a first event from the producer plugin during execution of the video game, and determines if the first event is of the event type to be reported to the consumer plugin. If the first event is of the event type, information associated with the first event is reported to the consumer plugin. In this manner, a data manager executed concurrently with a video game may enable sharing of information across different plugins that are thereto.

This approach has numerous advantages, including but not limited to managing the sharing of data between plugins of a content overlay engine in a manner that reduces system resources. For instance, by implementing a centralized data sharing manager, plugins may interact with the data manager to identify the types of events that are desired to be reported back to the plugins. In this manner, the data manager can identify whether events should be reported to each of the plugins, thereby avoiding the need for each individual plugin to separately obtain information from a desired source (e.g., a content overlay engine, a video game, a system executing the video game, etc.). For instance, if a plurality of individual plugins separately requested the same type of event information from a computing system, the system may perform duplicative and unnecessary processing operations to report the requested information back to the plugins, leading to overall processing inefficiencies. By employing a centralized data manager, wasteful processing resulting from separate plugins independently obtaining video game-related event information can be reduced.

Further, reduction in the wasteful processing can also lead to performance improvements of the system on which a video game is executing, such as by enabling the video game to continue to present graphics to a user at high frame rates and/or without lag or delay. As a result, event information related to video-game content may be shared with reduced processing resources, thereby enabling such resources to be preserved for the actual gameplay and continue to deliver a high-performance experience.

Further, implementations described herein also enable enhanced security for video games and systems executing such video games. For instance, the data manager responsible for managing the sharing of data across plugins may restrict a plugin's direct access to event information outputted by a video game or an operating system executing the video game, security of the video game and operating system are improved, e.g., by reducing the risk that a plugin alters functionality of a video game or performs otherwise malicious or unintended actions with respect to the video game or operating system.

Example implementations will now be described that are directed to techniques for sharing data across plugins of a content overlay engine. For instance, FIG. 1 shows a block diagram of a system 100 for managing data in a content overlay engine, according to an example embodiment. As shown in FIG. 1, system 100 includes a computing device 102, a network 110, and one or more computing device(s) 112.

Network 110 may comprise one or more networks such as local area networks (LANs), wide area networks (WANs), personal area network (PANs), enterprise networks, the Internet, etc., and may include wired and/or wireless portions. Computing device 102 and computing device 112 may be communicatively coupled via network 110. In an implementation, computing device 102 and computing device 112 may communicate via one or more application programming interfaces (API), and/or according to other interfaces and/or techniques. Computing device 102 and computing device 112 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 102 comprises a content overlay engine 104 and a video game 108. In examples, computing device 102 may comprise a device configured to output a video signal comprising one or more video frames (e.g., of video game 108) to a display screen. Computing device 102 may comprise a video game console (e.g., a Microsoft Xbox® of any version, a Sony PlayStation® of any version, A Nintendo Wii®, NES, or Switch™ of any version, etc.), a desktop computer, a portable computer, a smartphone, a tablet, a wearable computing device, a head mounted gaming device, a mixed and/or virtual reality device (e.g., Microsoft HoloLens™), or any other processing device for executing video game 108 and outputting video frames generated by the video game, such as to a display device (co-located with computing device 102 and/or located remotely). Although not shown in FIG. 1, a display device of computing device 102 may comprise any type of display suitable for receiving and displaying video frames generated by a video game. For instance, the display device may be a liquid crystal display, cathode ray tube display, light-emitting diode display, a plasma display, a display screen of a projector television, or any other type of display that may be coupled to computing device 102 through a suitable interface. The display device of computing device 102 may either be external to or incorporated in computing device 102. An example computing device that may incorporate the functionality of computing device 102 is discussed below in reference to FIG. 7.

Video game 108 may include any type of video game executable or playable on computing device 102. Video game 108 may comprise any type of video game genre, such as sports, action, racing, adventure, role playing, simulation, strategy, educational, etc. Video game 108 may comprise games of any level of player interaction (e.g., fast-action or fast-paced games, slow moving games, single-player games, multi-player games, etc.). As other examples, video game 108 may include games or activities such as card games (e.g., Solitaire), crossword puzzles, mathematical games, trivia games, family games etc. In implementations, video game 108 may be stored locally on computing device 102 or may be stored on a removable storage, such as a compact-disc (CD), a digital video disc (DVD), a Blu-Ray™ disc, or any other medium that may be accessed by computing device 102. In other implementations, video game 108 may be stored remotely (e.g., on a local or remotely-located server accessible via network 110) and/or streamed from a local or remote server.

Computing device(s) 112 may include one or more computing devices (e.g., user devices or other consumer electronic devices) and/or server devices, co-located or located remotely, comprising, for instance, a cloud-based computing platform, that provide and/or receive information from content overlay engine 104. It is to be understood that system 100 may comprise any number of computing device(s) 112 and each device may be located in any one or more locations. For instance, computing device(s) 112 may include one or more remote devices of remote viewers interacting with a user of computing device 102 (e.g., viewing or streaming a real-time gameplay of video game 108). Computing device(s) 112 may comprise a mobile device, including but not limited to a mobile computing device (e.g., a Microsoft® Surface® device, a PDA, a laptop computer, a notebook computer, a tablet computer such as an Apple iPad™, a netbook, etc.), a mobile phone, a handheld video game device, a wearable computing device, a head mounted gaming device, or a mixed and/or virtual reality device (e.g., Microsoft HoloLens™). Computing device(s) 112 may comprise a stationary device such as but not limited to a desktop computer or PC (personal computer), a video game console, a set-top box, a television, or a smart device, such as a voice-activated home assistant device. In implementations, computing device(s) 112 may comprise one or more output devices, such as a speaker and/or a display device (not shown) configured to output audio and/or video content representing the real-time gameplay of video game 108. In example embodiments, computing device(s) 112 may be coupled to content overlay engine 104 via one or more plugins to obtain content from content overlay engine 104, or provide content to content overlay engine 104. Computing device(s) 112 may interface with content overlay engine 104 via network 110 through a suitable API, and/or by other mechanisms, such as a web browser (e.g., Microsoft® Internet Explorer, Google® Chrome, Apple® Safari, etc.). Note that any number of plugins or web browsers may be present in examples.

In other implementations, computing device(s) 112 may include server or other device for interacting with content overlay engine 104. In one implementation, computing device(s) may include devices that perform an analysis of gameplay of video game 108, such as by identifying graphical objects that are being displayed by video game 108, analyzing progress made by a user during gameplay (e.g., which level a user is playing, an estimated time of completing a level, etc.), providing hints to content overlay engine 104 during gameplay based on analyzing an output of video game 108, or any other game analysis techniques that may be performed in real-time, near real-time, or at a time period after gameplay. In other implementations, computing device(s) 112 may include servers or other devices for providing multimedia content (e.g., audio and/or video content) to content overlay engine 104 to be presented during execution thereof. For instance, computing device(s) 112 may comprise a server for providing audio content to be played by content overlay engine 104 during gameplay of video game 108. In yet other implementations, computing device(s) 112 may include a server for enabling interaction with other computing devices, such as interaction via a messaging service, where such interaction may be provided by content overlay engine 104 during execution of video game 108. These examples are not intended to be limiting, and it will be appreciated that computing device(s) 112 may include any other device for consuming information from content overlay engine 104 and/or providing information to content overlay engine 104. Additional examples will be described in greater detail below. An example computing device that may incorporate the functionality of computing device(s) 112 is described below in reference to FIG. 7.

Content overlay engine 104 is configured to execute concurrently with video game 108 and supplement content or features of video game 108 with additional content or features during execution thereof. In examples, content overlay engine 104 may provide information produced by one or more plugins coupled thereto, as will be described in greater detail below. It is noted and understood that supplemental content overlaid by content overlay engine 104 is not limited to content that is graphically presented (e.g., as a graphical overlay or other graphical object in a video frame), but may include any other type of supplemental content that is not graphically presented in a video frame (e.g., audio content). In implementations, content overlay engine 104 may be executed concurrently with video game 106 such that content overlay engine 104 may present content simultaneously with the real-time gameplay of video game 108. For example, content overlay engine 104 may be configured as an application that may be executed concurrently with video game 108 on a common operating system. In other example embodiments, content overlay engine 104 may be implemented as a shell-level or top-level application executable on an operating system such that it may present additional content (e.g., as graphical objects or non-graphical content). In another example, content overlay engine 104 may implemented in an application such as Game Bar developed by Microsoft Corporation of Redmond, Wash.

Data manager 106 may be configured to manage the information obtained by content overlay engine 104 from one or more producing entities, and information provided by content overlay engine 104 to one or more consuming entities during execution of video game 108. In examples, data manager 106 may be responsible for an overall collection, filtering, and/or brokering of data from different plugins coupled to content overlay engine 104, such that data that is most relevant to each plugin can be identified and appropriately provided. For instance, as described below, data manager 106 may collect and collate event notifications, determine whether the event notifications are applicable or relevant to any consuming widget, and composes and sends information for the events to the consuming plugins as appropriate.

Plugins of content overlay engine 104 may include any suitable interface (e.g., communication channel) for receiving information from and/or providing information to content overlay engine 104. For instance, plugins may include consumer plugins that may consume (e.g., receive) information from content overlay engine 104, producer plugins that produce (e.g., provide) information to content overlay engine 104, and/or producer-consumer plugins that produce and/or consume content. Examples of plugins include a chat plugin for enabling interaction with other users, an audio or video plugin for presenting multimedia content, a game analysis plugin for presenting the results of game analytics, a system monitor plugin for presenting real-time system parameters. The aforementioned examples are not intended to be limiting, and additional examples will be described in greater detail below.

As described above and will be described in greater detail below, data manager 106 may be configured to manage the flow of information to and from each plugin coupled to content overlay engine 104. For instance, data manager 104 may identify an event type (e.g., a game milestone reached during execution of video game 108) to be reported to a consumer plugin coupled to content overlay engine 104. If data manager 106 receives a notification of an event from a producer plugin, such as a game context engine that outputs events during execution of video game 108, data manager 106 may provide information associated with the event to the consumer plugin if the event is of the event type. In this manner, data manager 106 may act as a broker of information that is passed through content overlay engine 104.

For instance, upon execution of data manager 106, data manager 106 may identify plugins that are currently registered with or installed on content overlay engine 104. Such registration may include registration of both producer and/or consumer plugins, which may include identification of each plugin's individual requirements, capabilities, configurations, schemas, etc. During execution of video game 108, data manager 106 may obtain notifications of events, such as game-related events from a game context engine that monitors and extracts game information, system-related events from a system context engine that monitors and extracts system information, or any other notifications from producing plugins (e.g., third party producer plugins). Data manager 106 may collect and/or collate the notifications of events received, and may determine whether to provide information associated with such events to any consuming plugin. For instance, as will be described below, data manager 106 may determine whether a received event is of an event type to be reported to a consumer plugin and provide information associated with the event to the consumer plugin in response to such a determination.

It will be appreciated to those skilled in the relevant arts that implementations are not limited to the illustrative arrangement shown in FIG. 1. For example, any one or more of the components illustrated in FIG. 1 may be implemented on computing devices not expressly shown, such as one or more cloud-based server devices. For instance, video game 108 may comprise a game that is not executed on computing device 102, but instead comprises a game that is executed in a cloud (e.g., on one or more cloud-based servers). In such a system, content overlay engine 104 and data manager 106 may also be implemented on one or more cloud-based servers for managing the sharing of data across plugins coupled to content overlay engine 104 in accordance with techniques described herein.

Figure 2:
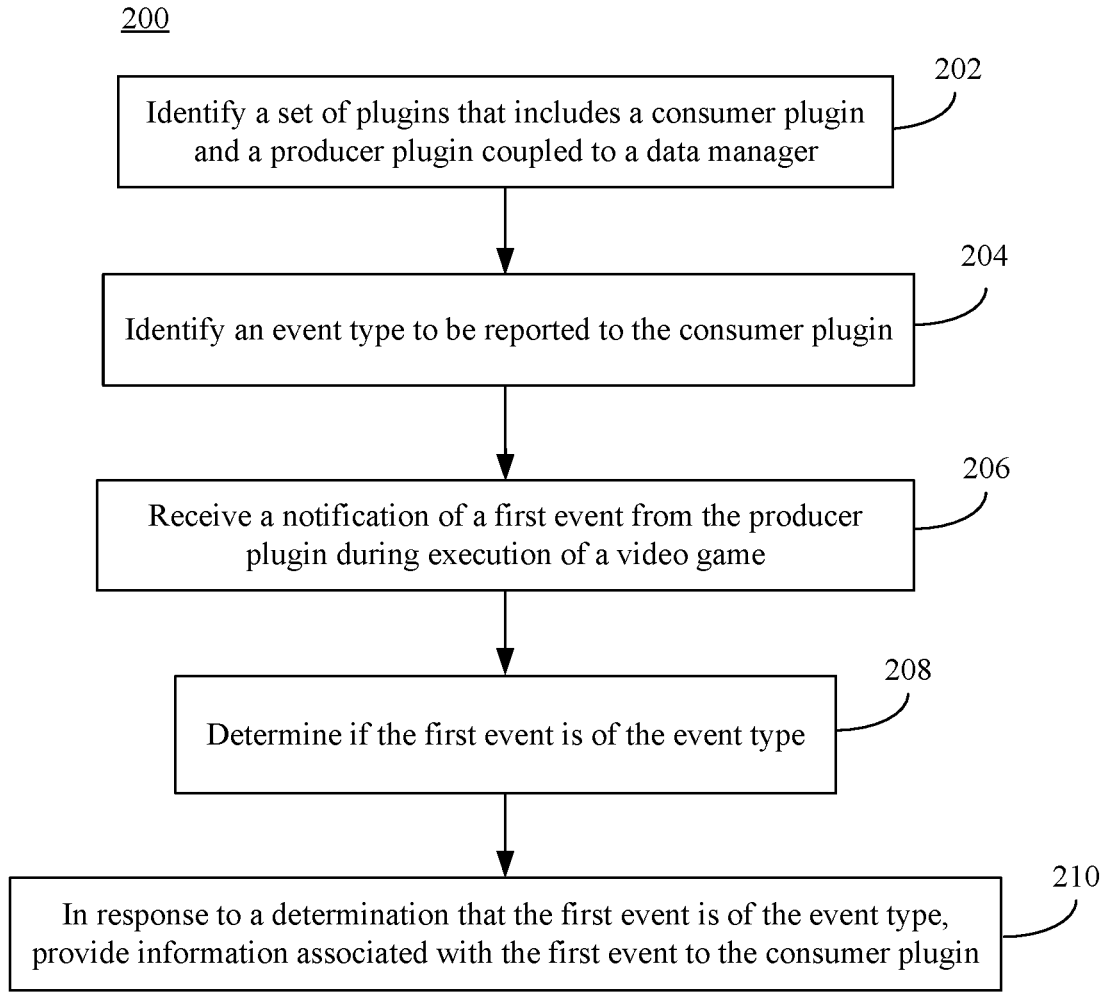
FIG. 2 shows a flowchart of a method for sharing information between plugins coupled to a data manager in a content overlay engine, according to an example embodiment.
Figure 3:
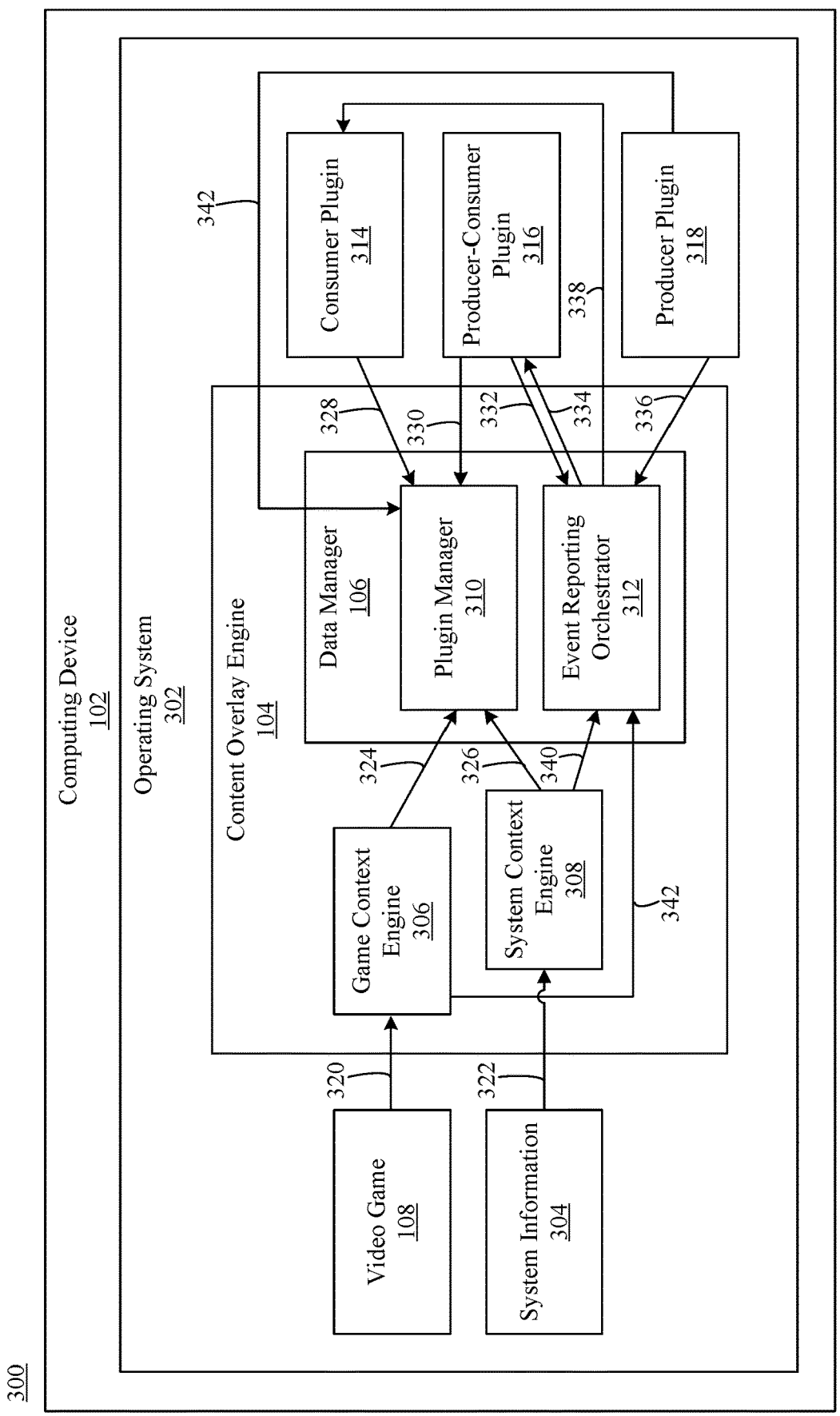
FIG. 3 shows a block diagram of a system for managing the sharing of data across plugins, according to an example embodiment.

Accordingly, in implementations, data manager 106 may manage the sharing of data across plugins of a content overlay engine 104 in various ways. For example, FIG. 2 shows a flowchart 200 of a method for sharing information between plugins coupled to a data manager in a content overlay engine, according to an example embodiment. In an implementation, the method of flowchart 200 may be implemented by data manager 106. For illustrative purposes, flowchart 200 and data manager 106 are described as follows with respect to FIG. 3. FIG. 3 shows a block diagram of a system 300 for managing the sharing of data across plugins, according to an example embodiment. As shown in FIG. 3, system 300 includes an example implementation of computing device 102. Computing device 102 includes an operating system 302. Operating system 302 includes an example implementation of content overlay engine 104, an example implementation of video game 108, system information 304, consumer plugin 314, producer-consumer plugin 316, and producer plugin 318. Content overlay engine 104 includes an example implementation of data manager 106, a game context engine 306, and a system context engine 308. Data manager 106 includes a plugin manager 310 and an event reporting orchestrator 312. In example implementations, any number of plugins may be coupled to content overlay engine 104, including additional plugins not shown in FIG. 3. Further, it is understood that fewer plugins than those illustrated in FIG. 3 may also be implemented. Flowchart 200 and system 300 are described in further detail as follows.

Flowchart 200 begins with step 202. In step 202, a set of plugins is identified that includes a consumer plugin and a producer plugin coupled to a data manager. For instance, with reference to FIG. 3, plugin manager 310 is configured to identify a set of plugins coupled to data manager 106. Data manager 106 may be executed when content overlay engine 104 and video game 108 are executed, such execution of content overlay engine 104, data manager 106, and video game 108 are concurrent with each other. Plugins coupled to data manager 310 may include, but are not limited to game context engine 306, system context engine 308, consumer plugin 314, producer-consumer plugin 316, and producer plugin 318. A plugin (also referred to as a "widget" herein) may include any application or executable code, with or without a user interface, that may interact or otherwise communicate with data manager 106 (e.g., via one or more communications channels or the like). In some examples, a plugin may be installed within, or added-on, to content overlay engine 104, such that the plugin is executed when content overlay engine 104 is executed.

As will be described in greater detail below, game context engine 306 may comprise a plugin that is configured to obtain 320 information associated with video game 108 that is concurrently executed. System context engine 308 may comprise a plugin that is configured to obtain 322 system information 304 that includes information associated with a system on which video game 108 is executing, such as information associated with an operating system. Consumer plugin 314 may include any plugin that is configured to receive event information from data manager 106, such as information associated with event of a particular event type identified by consumer plugin 314. Producer plugin 318 may include any plugin that is configured to provide notifications of events to data manager 106, such as notifications of events occurring in video game 108, events on operating system 302, or events from any other source that may be consumed by consuming plugin 314. Producer-consumer plugin 316 may include any plugin that is configured to receive event information from data manager 106, as well as provide notifications of events to data manager 106. Each of these will be described in greater detail below, along with example implementations.

As one illustrative example, a consumer plugin may comprise a plugin to display a real-time frames per second (FPS) rate associated with execution of video game 108. In another example, a consumer plugin may comprise an audio plugin for playing back audio content during execution of video game 108 based on game events. In yet another example, a consumer plugin may comprise a game analysis plugin that is configured to obtain game-related information and optionally provide results of a game analysis in real-time to data manager 106. Accordingly, in implementations, plugins described herein may be configured to consume any type of information provided by data manager 106 (which may include information produced by another plugin) and/or provide any type of information to data manager 106 (which may include information for consumption by another plugin) during execution of video game 106. As described in greater detail below, data manager 106 may be configured to collect, filter, and/or broker such information such that it is shared appropriately across the plugins coupled thereto.

One or more plugins as described herein may optionally comprise a user interface that may provide interactive control through which the plugin may be configured, such as to define event types that should be reported to the plugin if the plugin is a consumer plugin, define event notifications that are reported by the plugin if the plugin is a producer plugin, how often event notifications should be generated and/or produced by a producer plugin (e.g., rate throttling), and/or configure any other aspects of the plugins, such as whether and/or how graphical elements should be rendered during execution of video game 108 which may provide an enhanced user experience.

It is noted and understood that the plugins illustrated in FIG. 3 are illustrative only. For instance, any number and/or combination of plugins may be present in an implementation, including greater or fewer than those plugins illustrated. For example, some implementations need not include game context engine 306, system context engine 308, consumer plugin 314, producer-consumer plugin 316, and/or producer plugin 318. In other implementations, a plurality of consumer plugins, producer-consumer plugins, and/or producer plugins may be coupled to data manager 106. It is also understood that although game context engine 306 and system context engine 308 are illustrated separately from each other and from producer plugin 318, game context engine 306 and system context engine 308 may be example implementations of producer plugin 318, and/or may be combined together as a single plugin. As described herein, plugins may be developed by any party, including a game developer, a developer of content overlay engine 104, or any third parties.

In step 204, an event type to be reported to the consumer plugin is identified. For instance, with reference to FIG. 3, plugin manager 310 may be configured to identify an event type that is to be reported to consumer plugin 314 (or producer-consumer plugin 316). In some implementations, a type of an event to be reported to consumer plugin 314 may include events generated by one or more producer plugins, such as game context engine 306, system context engine 308, producer-consumer plugin 316, and/or producer plugin 318. The event type may comprise any type of event that may be generated with respect computing device 102, such as an event related to operating system 302, event related to video game 108 executed on operating system 302, or an event generated by another producer plugin based on any other type of information (e.g., an output of a third-party game analysis plugin). In some example implementations, the event type may comprise an event category (such as achievements obtained in a game, a current game level being played, a CPU usage, etc.).

In examples, consumer plugin 314 may define the event type and provide the definition of the event type to plugin manager 310, as described in greater detail below. In some other implementations, consumer plugin 314 may also be configured to identify an event type by identifying a predefined event type defined by data manager 106, such predetermined event types that may be defined for outputs of game context engine 306 (e.g., video game related information that may be generated from an output of video game 108) or system context engine 308 (e.g., system information that may be generated for operating system 302 that executes the video game, such as a current CPU rate, FPS rate, etc.). Accordingly, while consumer plugin 314 may provide, to data manager 106, a definition of an event type to be reported to the plugin, consumer plugin 314 may also select a predetermined event type.

As noted earlier, consumer plugin 314 may optionally comprise an interface, such as a graphical user interface, an audio interface, etc. for presenting information based on the event types that are to be reported to the plugin. For instance, an audio plugin may be configured to playback certain types of audio content (e.g., a particular song, genre, theme, tempo, etc.) based on event information reported to the plugin, such as progress in a game as identified by game context engine 306 or any other producer plugin. In other examples, consumer plugin 314 may be configured to provide graphical content (e.g., text, images, videos, etc.) that is to be graphically rendered concurrently with execution of video game 108. Such rendering may be performed as an overlay, where supplemental content provided by consumer plugin 314 may be provided for presentation on top of video game content in a translucent or opaque manner and/or may be provided for concurrent presentation on a different portion of a display (e.g., adjacent to graphical content outputted by video game 108). However, it is also noted some consumer plugins need not render or provide any supplemental content for presentation at computing device 102, but may be configured to receive event information without providing any supplemental content for presentation (e.g., a third-party game analysis engine).

It is noted that plugin manager 310 may be configured to identify any number of event types to be reported to a given consumer plugin, and any number of consumer plugins may be present. Thus, although examples described herein illustrate operation of example embodiments with respect to a single consumer plugin, it is understood that techniques may be applied where any number of consumer plugins are coupled to data manager 106 with any number of event types to be reported to each of the consumer plugins.

In step 206, a notification of a first event is received from the producer plugin during execution of the video game. For instance, with reference to FIG. 3, event reporting orchestrator 312 may be configured to receive a notification of a first event from a producer plugin, such as receiving 342 a notification from game context engine 306, receiving 340 a notification from system context engine 308, receiving 336 a notification from producer plugin 318, and/or receiving 332 a notification from producer-consumer plugin 316). A notification of a first event may include, for example, any information or indication that an event has been obtained and/or generated by a producer plugin. Such event notification may comprise notifications regarding events related to computing device 102, such as an event occurring with respect to video game 108, operating system 302, or an event generated and/or obtained by a producer plugin from another source (e.g., a third-party game analysis engine). The notification of the event received by event reporting orchestrator 312 may include any data payload that includes information associated with generation or occurrence of the event, such as the identity of the producer of the event (e.g., the producer plugin), the type of the event, a value associated with the event (e.g., a CPU usage rate, an identification of a level that was passed or a current level being played), a time of occurrence of the event, or any type of data related with occurrence of the event.

Notifications of events occurring on video game 108 may include game-related information such as a video game title, current level being played, an achievement obtained during execution of video game 108, an identification of objects present in a current frame rendered by video game 108, or any other characteristics related to the operation of video game 108. Notification of events occurring on operating system 302 may include information associated with a system that is executing video game 108, such as a CPU usage rate, a CPU temperature, an FPS rate, etc. Additional non-limiting examples of video game information and system information 304 will be described in greater detail below.

Producer plugins (e.g., any one or more of game context engine 306, system context engine 308, producer-consumer plugin 316, and producer plugin 318) may be configured to generate event notifications based on any time interval, including at periodic and/or non-periodic times. For instance, producer plugins may generate and provide notifications of events to event reporting orchestrator 312 continuously (e.g., a continuous CPU usage or FPS rate). In other examples, producer plugins may generate and provide notifications of events that may be based on other triggers, such as based on a current gameplay of video game 108 (e.g., a game achievement being obtained, or a level being completed in video game 108). These examples are illustrative only, and it is understood that producer plugins may generate and provide notifications of events to event reporting orchestrator 312 based on other trigger or timing depending on what may be occurring during execution of video game 108.

In step 208, it is determined if the first event is of the event type. For instance, with reference to FIG. 3, event reporting orchestrator 312 is configured to determine whether the first event received from a producer plugin is of the event type identified for consumer plugin 314. For example, event reporting orchestrator 312 may compare information in the notification of the first event, such as a name of an event, a type of event, an event source (e.g., the identity of the plugin providing the event), etc. to determine whether the event is of the event type that should be reported to consumer plugin 314 (e.g., based on the event type defined by the consumer plugin). Stated differently, event reporting orchestrator 312 may be configured to determine, based on a notification of an event from a producer plugin, whether information associated with the event should be reported to any one or more consumer plugins.

As an illustration, consumer plugin 314 may indicate to plugin manager 310 that the consumer plugin requests event information associated with an FPS rate during execution of video game 108. During execution of video game 108, event reporting orchestrator 312 may receive an event notification (or a plurality of event notifications) from system context engine 304 that provide a current FPS rate. In this example, event reporting orchestrator 312 may determine, based on the event notification (or notifications) that the FPS rate should be reported to consumer plugin 314. In another illustration, plugin manager 310 may identify, for consumer plugin 314, an event type comprising an advancement of a game level during execution of video game 108. During execution of the video game, event reporting orchestrator 312 may receive one or more notifications from game context engine 306 that indicate that a user has advanced to a different game level. In this example, event reporting orchestrator 312 may therefore determine that the event received from game context engine 306 is of the event type (advancement of a game level) to be reported to consumer plugin 314. These examples are only illustrative, and it is understood that techniques described herein may be implemented for any other type of event and/or notifications of events.

In step 210, in response to a determination that the first event is of the event type, information associated with the first event is provided to the consumer plugin. For instance, with reference to FIG. 3, event reporting orchestrator 312 may be configured to provide 338 information associated with the first event to consumer plugin 314 in response to a determination that the first event is of the event type. Event reporting orchestrator 312 may provide the information associated with the first event to consumer plugin 314 in various ways. For example, the information associated with the first event provided to consumer plugin 314 may include information contained in the notification received from the producer plugin or a subset thereof. In some other examples, the information associated with the first event provided to consumer plugin 314 may comprise a custom artifact as identified by the consumer plugin. For instance, the information may comprise a different format than the notification received from the producer plugin, such as a format that was requested by the consumer plugin. In other examples, the information associated with the first event provided to consumer plugin 314 may also include additional information that was not included in the notification, such as information that may be obtained from one or more other producer plugins. Event reporting orchestrator 312 may provide the information associated with the first event provided to consumer plugin 314 at any time, such as in real-time (e.g., as soon as it is determined that the first event is of the event type), and/or at any other delayed time or interval.

As a result, based on the event type (e.g., category) of an incoming event notification and filtering (e.g., to identify and provide event information to those consuming widgets that request it), plugins coupled to data manager 106 of content overlay engine 104 may be enabled to share event-related information with each other, such as contextual information of video game 108 being concurrently executed, system information 104 associated with operating system 302 that is executing video game 108, and any other plugins that may be coupled to data manager 106, thereby allowing the functionality of plugins to be enhanced to enrich an overall gaming experience for a user. Furthermore, providing a data surface (e.g., data manager 106) through which plugins may share event-related information with each other may be carried out in a manner that is non-intrusive to a user's gaming experience and light weight, as well as enabling contextual information (e.g., blending game context information, system context information, and any other event information from other plugins) to be shared in real-time.

Thus, in contrast with other techniques in which contextual information for a game or a system executing a game can be obtained through applications or other processes that are injected into the game or system (e.g., potentially risking the integrity of the game and/or system), techniques described herein provide a data manager that acts as an intermediate broker of information shared across different content producers and consumers in a manner that does not require any third-party process to be injected in game or system. In other words, because event-related information obtained from a video game or system is shared through a brokering entity, such information is not able to be accessed directly by third-party plugins, thereby providing an interactive framework that enables sharing of information in an extensible manner while enhancing the integrity of a video game and system executing the video game. Furthermore, because plugins need not be directly injected into a video game or system executing the video game, techniques described herein enable third parties to develop consumer and/or producer plugins for integration with a content overlay engine.

Although techniques described herein relate to an interactive sharing framework for events associated with a video game, it is noted and understood that the disclosed techniques may also be implemented on any other type of running process on a computing device where event information may be shared across different consumer and/or producer plugins.

As described above, in examples, event reporting orchestrator 312 may obtain contextual information associated with video game 108 that is concurrently executing and/or contextual information associated with a system that is executing video game 108. For instance, FIG. 4 shows a flowchart 400 of a method for receiving a notification of an event from a game context engine or a system context engine, according to an example embodiment. In an example, the method of flowchart 400 may be implemented by event reporting orchestrator 312, as shown in FIG. 3. Other structural and operational implementations will be apparent to persons skilled in the relevant art(s) based on the following discussion regarding system 300 and flowchart 400.

Flowchart 400 begins with step 402. In step 402, a notification of a first event is received from a game context engine or a system context engine during execution of a video game. For instance, with reference to FIG. 3, event reporting orchestrator 312 may receive a notification of a first event from game context engine 306 or system context engine 308 during execution of video game 108. As described earlier, game context engine 306 and system context engine 308 are examples of producer plugin 318.

Game context engine 306 may be configured to generate and provide to event reporting orchestrator 312 a notification of an event that includes game context information based on an output of video game 108 during execution thereof. Game context information may be obtained from video game 108, or may be derived from an output of video game 108. Such game context information includes, but is not limited to an identification of video game 108 (e.g., a game title), game elements that are currently being rendered by video game 108 during execution thereof, a game level or scene being played, an indication of action level, an indication relating to a brightness and/or a darkness (e.g., whether the game scene is a daytime or nighttime scene), a difficulty level, achievements being obtained in the game, indications of events occurring during gameplay (e.g., winning a race or match, etc.), an age or content rating of the video game, or any other information associated with video game 108.

As discussed earlier, game context engine 306 may obtain game context information directly from an output of video game 108, such as where a developer of video game 108 programs the video game to output one or more of such event notifications. In other implementations, game context engine 306 may be configured to generate notification of events using other techniques based on observing an output of video game 108, such as by scraping screen content or analyzing content rendered by video game 108 using a machine learning algorithm or any other suitable manner. Additional details regarding the analyzing content rendered by a video game may be found in U.S. patent application Ser. No. 16/399,664, filed on Apr. 30, 2019 and entitled "Contextual In-Game Element Recognition and Dynamic Advertisement Overlay," the entirety of which is incorporated by reference.

As an example, a consumer plugin, such as an audio widget, may request a game title to be reported to the audio widget in order to playback certain genres or playlists during execution of video game 108. In a further example, such an audio widget may also be provided with information indicating that a current scene of video game 108 is a difficult or dark scene. In this example, such information may be consumed by the audio widget to play different types of audio content during execution of the video game. These examples, however, are only illustrative.

System context engine 308 may be configured to generate and provide to event reporting orchestrator 312 a notification of an event based on system information 304, where system information 304 includes context information of a computing device on which data manager 106 and video game 108 are executed. System information 304 may comprise information associated with or obtained from operating system 302 that is executing data manager 106 and video game 108. In some implementations, system information 304 includes information that is external to video game 108. System information 304 may comprise any information associated with computing device 102 and/or operating system 302, including but not limited to a current CPU or graphics processing unit (GPU) usage, a CPU or GPU temperature, a list of running processes, a network utilization, a frame rate (e.g., FPS), a disk usage, a memory (e.g., RAM) usage, a display resolution, a fan speed of computing device 102, or any other information that may be associated with performance of computing device 102 during execution of video game 108.

System context engine 308 may obtain system information 304 by monitoring and/or analyzing data from computing device 102 and/or operating system 302, and provide notifications of events based on system information 304 to event reporting orchestrator 312. In some implementations, a consumer plugin 314 may be configured to receive information associated with one or more of such events from event reporting orchestrator 312, and optionally render certain system context information (e.g., a current framerate) in real-time during execution of video game 108.

In examples, plugin manager 310 may identify an event type to be reported to a consumer plugin in various ways. For instance, FIG. 5 shows a flowchart 500 of a method for receiving an event definition from a consumer plugin, according to an example embodiment. In an example, the method of flowchart 500 may be implemented by plugin manager 310, as shown in FIG. 3. Other structural and operational implementations will be apparent to persons skilled in the relevant art(s) based on the following discussion regarding system 300 and flowchart 500.

Flowchart 500 begins with step 502. In step 502, an event definition is received from a consumer plugin that defines at least the event type and a reporting schema of the event type during a boot-up procedure of the data manager. For instance, with reference to FIG. 3, plugin manager 310 may be configured to receive 328, from consumer plugin 314, an event definition that defines at least the event type and a reporting schema of the event type to be reported to consumer plugin 314 during a boot-up procedure of data manager 106, such as when content overlay engine 104 is executed. The reporting schema may include a format or structure of the reporting, a reporting frequency, a manner of communication, and any other parameters that define the manner in which event-related information should be reported to the consumer plugin. In this manner, plugin manager 310 may be configured to register, during an initial boot-up procedure, each plugin coupled to data manager 106 and the event types to be reported to each such plugin.

As an illustration, consumer plugin 314 may provide to plugin manager 310 an event definition that defines an event type associated with a game context (e.g., identification of a current level being played), while not providing any event definitions for other types of events (e.g., system-related events). During execution of video game 108, event reporting orchestrator 312 may therefore report information to consumer plugin 314 received from game context engine 306 that relate to identification of a current level being played in the video game, while not reporting other information that was not requested. In this manner, consumer plugin 314 may be configured to receive only the information that it requests in an event definition provided to plugin manager 310.

In some implementations, plugin manager 310 may receive a plurality of event definitions from the same consumer, with each event definition defining an event type and an associated reporting schema. In some other implementations, the event definition may define a plurality of event types to be reported to the consumer plugin and a reporting associated with each of the event types.

Plugin manager 310 may receive event definitions from each plugin that is identified as a consumer plugin, thereby identifying all of the event types that are to be shared across each consumer plugin along with their respective reporting schema. When a notification of an event is received by event reporting orchestrator 312, it may be determined which one or more consuming plugins (if any) should receive information associated with the event notification, and information may be appropriately provided to the consuming plugins in accordance with the associated reporting schema.

It is also noted and understood that although it is described herein that plugin manager 310 may register each consuming plugin coupled to data manager 106 during a boot-up procedure, similar registration may also occur for each producing plugin coupled to data manager 106 during the initial boot-up procedure. For instance, during the boot-up procedure, plugin manager may also be configured to identify each producing plugin, along with the types of event notifications that may be produced by the producing widget. For example, plugin manager 310 may identify 324 game context engine 306 as a producing plugin, identify 326 system context engine 308 as a producing plugin, identify 330 producer-consumer plugin 316 as a consumer and/or producer plugin, and identify 344 producer plugin 318 as a producing widget.

In some further implementations, data manager 106 may expose a common application programming interface (API), or any other interface, for receiving event definitions from one or more consumer plugins and receiving event notifications from one or more producer plugins. For example, data manager 106 may provide a common interface through which plugins may communicate with the data manager, such that integration among the data manager and the plugins coupled thereto may be simplified. In this manner, plugins coupled to data manager 106 may be developed by developers external or unaffiliated with content overlay engine 104 or video game 108 to further enrich a user's gaming experience.

In yet some further implementations, upon plugin manager 310 receiving event definitions from each consuming plugin coupled to data manager 106, event reporting orchestrator 312 may be configured to collect only a subset of information from producing widgets coupled to data manager 106. For instance, event reporting orchestrator 312 may be configured to collect only notifications associated with the event types that are defined by one or more consumer plugins, thereby eliminating the need to collect and filter other event-related information that will not be shared.

As described above, certain types of plugins may be configured to consume and produce event-related information to data manager 106. For instance, FIG. 6 shows a flowchart 600 of a method for providing event information to a producer-consumer plugin, according to an example embodiment. In an example, the method of flowchart 600 may be implemented by plugin manager 310 and event reporting orchestrator 312, as shown in FIG. 3. Other structural and operational implementations will be apparent to persons skilled in the relevant art(s) based on the following discussion regarding system 300 and flowchart 600.

Flowchart 600 begins with step 602. In step 602, a second event type to be reported to a producer-consumer plugin is identified. For instance, with reference to FIG. 3, plugin manager 310 is configured to identify 330 a second event type to be reported to another plugin, such as a producer plugin that is a producer-consumer plugin 316. In other words, in some example implementations, a producer plugin that is a producer-consumer plugin may also be configured to consume event information in addition to producing notifications regarding other events. For example, an audio widget that consumes certain types of events (e.g., game levels currently being played) may also be configured to produce 332, to data manager 106, notifications regarding the type of music being played by the audio widget (e.g., a tempo, genre, etc.). Thus, in such an example, the audio widget may comprise a consumer-producer plugin since it both produces and consumes event-related information. This is only one illustration, and additional non-limiting examples will be described in greater detail below.

In step 604, a notification of a second event is received from a second producer plugin during execution of a video game. For instance, with reference to FIG. 3, event reporting orchestrator 312 may receive a notification of a second event from a second producer plugin (e.g., any one of game context engine 306, system context engine 308, or producer plugin 318) that is different from a first producer plugin (e.g., producer-consumer plugin 316) during execution of video game 108. Step 604 may be carried out in a manner similar to step 206 described above with respect to FIG. 2. The notification of the second event can relate to any type of event occurring on computing device 102, including but not limited to events occurring with respect to video game 108, operating system 302, or any other event received from an external or third party producer plugin.

In step 606, it is determined if the second event is of the second event type. For instance, with reference to FIG. 3, event reporting orchestrator may be configured to determine if the second event received from the second producer plugin is of the second event type to be reported to producer-consumer plugin 316. Step 606 may be carried out in a manner similar to step 208 as described above with respect to step 208 of FIG. 2. For example, if the second event, identified in a notification received from the second producer plugin, matches the second event type (i.e., an event type to be reported to producer-consumer plugin 316), it may be determined that information associated with the second event should be provided to producer-consumer plugin 316.

In step 608, information associated with the second event is provided to the producer-consumer plugin in response to a determination that the second event is of the second event type. For instance, with reference to FIG. 3, event reporting orchestrator 312 may be configured to provide 334 information associated with the second event (e.g., based on the notification received from the second producer plugin) to producer-consumer plugin 316 in response to a determination that the second event is of the second event type. Step 608 may be carried out in a manner similar to step 210 as described above with respect to step 208 of FIG. 2. In this manner, various plugins (including consumer plugins, producer plugins, and producer-consumer plugins) may be interconnected together via data manager 106 such that information can be shared between the plugins in real-time. Illustrative examples of how interactive sharing may occur in real time are described in greater detail below.

III. Additional Example Data Sharing Embodiments

The following sections are intended to describe additional example embodiments in which implementations described herein may be provided. Furthermore, the sections that follow explain additional context for such example embodiments, details relating to the implementations, and evaluations of such implementations. The sections that follow are intended to illustrate various aspects and/or benefits that may be achieved based on techniques described herein, and are not intended to be limiting. Accordingly, while additional example embodiments are described, it is understood that the features described below are not required in all implementations.

As described above, content overlay engine 104 may comprise a shell experience that is configured to execute concurrently with video game 108, such that supplemental content from one or more plugins may be provided and/or optionally rendered (e.g., as a graphical overlay, via an audio output, etc.) by content overlay engine to computing device 102 during execution of the video game. In accordance with implementations, content overlay engine 104 may provide a light-weight surface through which plugins (which may be authored by a developer of the overlay engine, the video game, and/or third parties) may interact with content overlay engine 104, as well as with each other to enable a rich game-play experience. Example scenarios where such interaction may be achieved are described below. It is noted that these examples are intended only to illustrate operation of the features of systems 100 and 300 as described herein, and are not intended to limit the scope of the disclosed embodiments. Further, it is noted and understood that any of the examples described below may be combined with other examples and/or other features described herein.

Example 1: In one example, consumer plugin 314 may comprise an audio plugin that is configured to obtain information regarding events occurring in video game 108 during execution thereof, and playback certain types of audio content based on the obtained event information. In this example, game context engine 306 may send notifications of events (e.g., winning a game or season in a sports game) to event reporting orchestrator 312. Event reporting orchestrator 312 processes the information received game context engine 306 (along with other incoming data that may be received from other producer plugins), and determines that information associated with the event notification received from game context engine should be provided to consumer plugin 314. Event reporting orchestrator 312 may provide this information to consumer plugin 314, which may then be configured to play a certain soundtrack for the user (e.g., a celebratory soundtrack).

Example 2: In another example, consumer plugin 314 may comprise a media-upload plugin that is configured to upload media content (e.g., game streams, video clips, image frames, Graphics Interchange Format (GIF) images, memes, etc.) related to video game 108 during execution thereof, such as in real-time. In this example, consumer plugin 314 may indicate that certain system context event types should be reported to the consumer plugin, such as platform information including but not limited to a CPU load, list of running processes, a network speed, and FPS information. During execution of video game 108 (which may comprise a resource intensive game), event reporting orchestrator 312 may obtain notifications of such system context events and determine that information associated with those events should be provided to consumer plugin 314. Consumer plugin 314 may obtain this information, and automatically determine whether to upload certain types of media content (e.g., images or videos) or whether (and/or how much) to compress high-fidelity media content to a lower quality before uploading to cause minimal impact of a user's gameplay experience.

Example 3: In another example, producer plugin 318 may comprise a chat plugin that enables interaction among different remote users during execution of video game 108, such as where users are waiting in a game lobby for a particular game session to commence. In this example, consumer plugin 314 may identify certain types of content (e.g., audio and/or video content, websites, etc.) being discussed among one or more of the remote users, and provide such information (e.g., a notification identifying the media content being discussed) to event reporting orchestrator 312. Event reporting orchestrator 312 may determine that information regarding the media content being discussed should be provided to a consumer widget for presenting the media content, such as a video widget. Upon receiving information associated with the media content being discussed among the remote users, consumer plugin 314 may automatically present the media content by accessing an appropriate source (e.g., a website or other network source).

Example 4: In another example, a producer plugin 318 may comprise a third-party game analysis engine (e.g., developed by a game researcher or other third party) configured to predict how long a user will spend to finish a current level that is being played and/or how the user is playing. Such a producer plugin may be integrated to data manager 106 as described herein to provide game-related predictions (e.g., time to finish a level). Such game-related predictions may be received by event reporting orchestrator 312, which may then provide information associated with the predictions to a consumer plugin (e.g., an audio widget) to determine a length of music or a playlist size for playback during execution of video game 108.

In some further implementations, event reporting orchestrator 312 may also be configured to provide both information associated with the game predictions from the producer plugin, as well as identification of a song being played by the audio widget, to game context engine 306 (which may also act as a consumer plugin), which may be analyzed to determine whether any specific songs, genres, etc. improve a user's gaming performance, thereby causing such types of audio to be provided or suggested in the future for further enhancing the user's gaming experience. In this manner, different plugins may interact with each other, using data manager 106 as the broker of the interaction.

Example 5: In another example, a producer-consumer plugin 318 may comprise a game engine for consuming game-related data (e.g., from game context engine 306) or image frames outputted by video game 108, and use machine-learning techniques to analyze a current execution of video game 108, such as the game level or scene that is being played, a score in a game, to identity game-related recommendations to the user (e.g., where the user should go to complete a mission, tools or elements that a user should locate and/or obtain in the video game, etc.), or any other recommendations. Such recommendations may be provided as a content overlay during execution of video game 108, and/or may be consumed by other consumer widgets as determined by data manager 106.

In another implementation, producer-consumer plugin may be configured to consume certain game-related information, apply machine-learning techniques to analyze the execution of a video game, and provide the results of such an analysis to event reporting orchestrator 312. Event reporting orchestrator 312 may provide this information to consumer plugin, which may be configured to identify game-related recommendations to the user in real-time.

Thus, the examples described above enable the real-time sharing of information between content overlay engine 104 and plugins coupled thereto in any suitable matter. While the examples described above illustrate specific scenarios in which techniques described herein may be implemented, these examples are not intended to be limiting, and other variations or implementations are also contemplated.

IV. Example Computer System Implementation

One or more of the components of computing device 102, content overlay engine 104, data manager 106, video game 108, computing device(s) 112, operating system 302, system information 304, game context engine 306, system context engine 308, plugin manager 310, event reporting orchestrator 312, consumer plugin 314, producer-consumer plugin 316, producer plugin 318, and one or more steps of flowcharts 200, 400, 500, and 600 may be implemented in hardware, or hardware combined with software and/or firmware. For example, one or more of the components of computing device 102, content overlay engine 104, data manager 106, video game 108, computing device(s) 112, operating system 302, system information 304, game context engine 306, system context engine 308, plugin manager 310, event reporting orchestrator 312, consumer plugin 314, producer-consumer plugin 316, producer plugin 318, and one or more steps of flowcharts 200, 400, 500, and 600 may be implemented as computer program code/instructions configured to be executed in one or more processors and stored in a computer readable storage medium.

In another implementation, one or more of the components of computing device 102, content overlay engine 104, data manager 106, video game 108, computing device(s) 112, operating system 302, system information 304, game context engine 306, system context engine 308, plugin manager 310, event reporting orchestrator 312, consumer plugin 314, producer-consumer plugin 316, producer plugin 318, and one or more steps of flowcharts 200, 400, 500, and 600 may also be implemented in hardware that operates software as a service (SaaS) or platform as a service (PaaS). Alternatively, one or more of the components of computing device 102, content overlay engine 104, data manager 106, video game 108, computing device(s) 112, operating system 302, system information 304, game context engine 306, system context engine 308, plugin manager 310, event reporting orchestrator 312, consumer plugin 314, producer-consumer plugin 316, producer plugin 318, and one or more steps of flowcharts 200, 400, 500, and 600 may be implemented as hardware logic/electrical circuitry.

For instance, in an implementation, one or more of the components of computing device 102, content overlay engine 104, data manager 106, video game 108, computing device(s) 112, operating system 302, system information 304, game context engine 306, system context engine 308, plugin manager 310, event reporting orchestrator 312, consumer plugin 314, producer-consumer plugin 316, producer plugin 318, and one or more steps of flowcharts 200, 400, 500, and 600 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
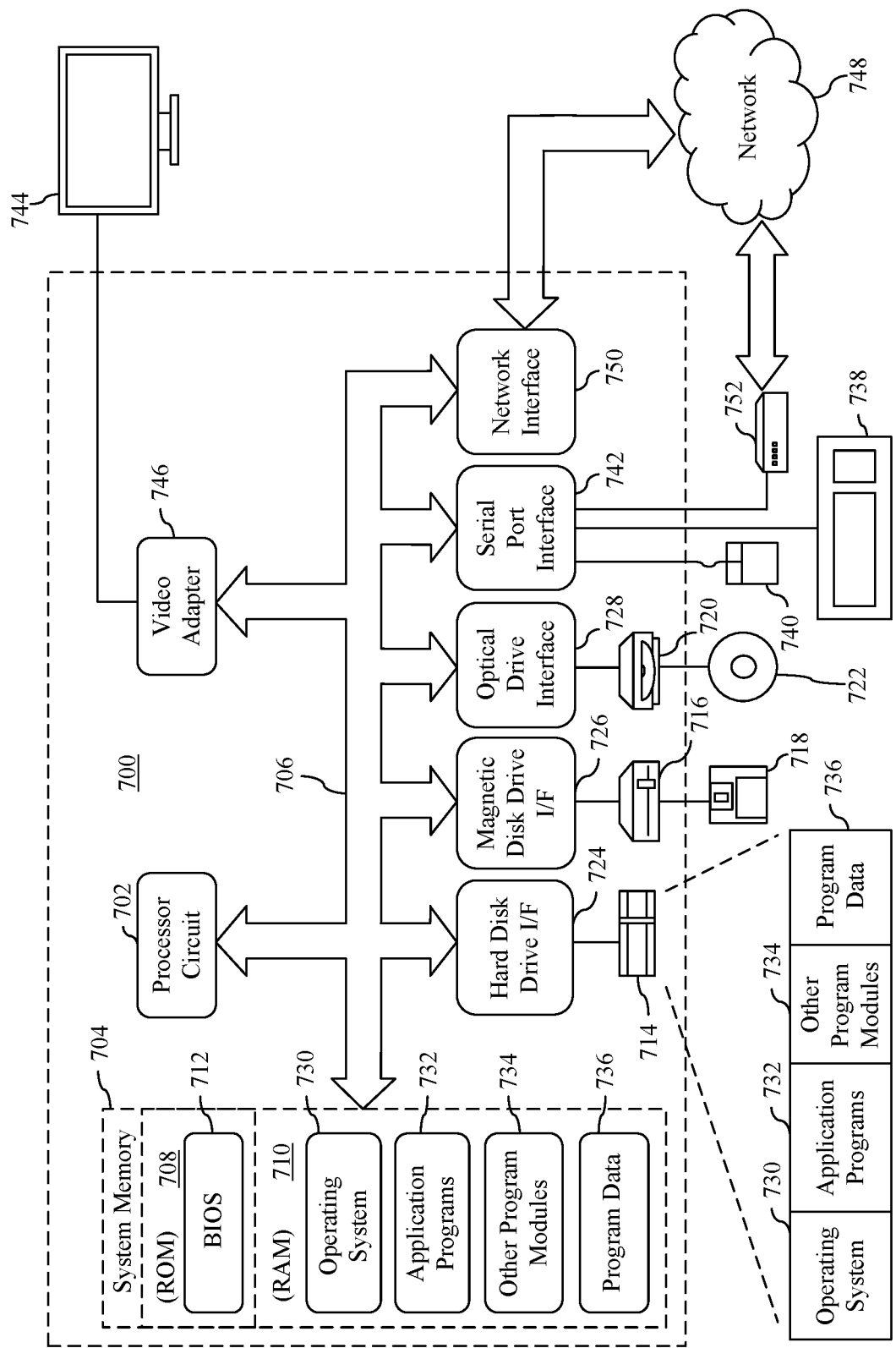
FIG. 7 is a block diagram of an example processor-based computer system that may be used to implement various example embodiments.

FIG. 7 depicts an implementation of a computing device 700 in which example embodiments may be implemented. For example, computing device 102, content overlay engine 104, data manager 106, video game 108, computing device(s) 112, operating system 302, system information 304, game context engine 306, system context engine 308, plugin manager 310, event reporting orchestrator 312, consumer plugin 314, producer-consumer plugin 316, and/or producer plugin 318 may each be implemented in one or more computing devices similar to computing device 700 in stationary or mobile computer implementations, including one or more features of computing device 700 and/or alternative features. The description of computing device 700 provided herein is provided for purposes of illustration, and is not intended to be limiting. Example embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couple various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing one or more of the components of computing device 102, content overlay engine 104, data manager 106, video game 108, computing device(s) 112, operating system 302, system information 304, game context engine 306, system context engine 308, plugin manager 310, event reporting orchestrator 312, consumer plugin 314, producer-consumer plugin 316, producer plugin 318, and one or more steps of flowcharts 200, 400, 500, and 600 and/or further implementations described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, stylus, pen, pointing device, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Implementations are also directed to such communication media that are separate and non-overlapping with implementations directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of example embodiments discussed herein. Accordingly, such computer programs represent controllers of the computing device 700.

Implementations are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Example Embodiments

A system for interconnecting plugins of a content overlay engine that is executed with a video game is disclosed herein. The system includes: at least one processor circuit; and at least one memory that stores program code configured to be executed by the at least one processor circuit, the program code comprising: a data manager that is executed concurrently with the video game, the data manager comprising: a plugin manager configured to: identify a set of plugins that includes a consumer plugin and a producer plugin coupled to the data manager, and identify an event type to be reported to the consumer plugin; and an event reporting orchestrator configured to: receive a notification of a first event from the producer plugin during execution of the video game; determine if the first event is of the event type; and in response to a determination that the first event is of the event type, provide information associated with the first event to the consumer plugin.

In one implementation of the foregoing system, the producer plugin comprises a game context engine; and the notification of the first event includes game context information generated based on an output of the video game during execution thereof.

In another implementation of the foregoing system, the producer plugin comprises a system context engine; and the notification of the first event includes system context information of a computing device on which the data manager and the video game are executed.

In another implementation of the foregoing system, the plugin manager is configured to identify the event type to be reported to the consumer plugin by receiving, during a boot-up procedure of the data manager, an event definition from the consumer plugin that defines at least the event type and a reporting schema of the event type.

In another implementation of the foregoing system, the data manager exposes a common API for receiving event definitions from consumer plugins and receiving event notifications from producer plugins.

In another implementation of the foregoing system, the producer plugin comprises a producer-consumer plugin, and the plugin manager is further configured to: identify a second event type to be reported to the producer-consumer plugin; and the event reporting orchestrator is further configured to: receive a notification of a second event from a second producer plugin during execution of the video game, determine if the second event is of the second event type, and in response to a determination that the second event is of the second event type, provide information associated with the second event to the producer-consumer plugin.

In another implementation of the foregoing system, the content overlay engine receives supplemental content for presentation during execution of the video game.

A method performed by a data manager of a content overlay engine that is executed with a video game is described herein. The method includes: identifying a set of plugins that includes a consumer plugin and a producer plugin coupled to the data manager; identifying an event type to be reported to the consumer plugin; receiving a notification of a first event from the producer plugin during execution of the video game; determining if the first event is of the event type; and in response to a determination that the first event is of the event type, providing information associated with the first event to the consumer plugin.

In one implementation of the foregoing method, the producer plugin comprises a game context engine; and the notification of the first event includes game context information generated based on an output of the video game during execution thereof.

In another implementation of the foregoing method, the producer plugin comprises a system context engine; and the notification of the first event includes system context information of a computing device on which the data manager and the video game are executed.

In another implementation of the foregoing method, the identifying the event type to be reported to the consumer plugin comprises receiving, during a boot-up procedure of the data manager, an event definition from the consumer plugin that defines at least the event type and a reporting schema of the event type.

In another implementation of the foregoing method, the method further includes exposing a common application programming interface (API) for receiving event definitions from consumer plugins and receiving event notifications from producer plugins.

In another implementation of the foregoing method, the producer plugin comprises a producer-consumer plugin, and the method further comprises: identifying a second event type to be reported to the producer-consumer plugin; receiving a notification of a second event from a second producer plugin during execution of the video game; determining if the second event is of the second event type; and in response to determining that the second event is of the second event type, providing information associated with the second event to the producer-consumer plugin.

In another implementation of the foregoing method, the method further comprises receiving, from the consumer plugin, supplemental content for presentation by the content overlay engine during execution of the video game.

A computer-readable storage medium is disclosed herein. The computer-readable storage medium has program instructions recorded thereon that, when executed by at least one processor of a computing device, perform a method, the method comprising: identifying a set of plugins that includes a consumer plugin and a producer plugin coupled to a data manager that is executed concurrently with the video game; identifying an event type to be reported to the consumer plugin; receiving a notification of a first event from the producer plugin during execution of the video game; determining if the first event is of the event type; and in response to a determination that the first event is of the event type, providing information associated with the first event to the consumer plugin.

In one implementation of the foregoing computer-readable storage medium, the producer plugin comprises a game context engine; and the notification of the first event includes game context information generated based on an output of the video game during execution thereof.

In another implementation of the foregoing computer-readable storage medium, the producer plugin comprises a system context engine; and the notification of the first event includes system context information of a computing device on which the data manager and the video game are executed.

In another implementation of the foregoing computer-readable storage medium, the identifying the event type to be reported to the consumer plugin comprises receiving, during a boot-up procedure of the data manager, an event definition from the consumer plugin that defines at least the event type and a reporting schema of the event type.

In another implementation of the foregoing computer-readable storage medium, the method further comprises exposing a common application programming interface (API) for receiving event definitions from consumer plugins and receiving event notifications from producer plugins.

In another implementation of the foregoing computer-readable storage medium, the producer plugin comprises a producer-consumer plugin, and the method further comprises: identifying a second event type to be reported to the producer-consumer plugin; receiving a notification of a second event from a second producer plugin during execution of the video game; determining if the second event is of the second event type; and in response to determining that the second event is of the second event type, providing information associated with the second event to the producer-consumer plugin.

VI. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the described implementations should not be limited by any of the above-described example embodiments, but should be defined only in accordance with the following claims and their equivalents.

What is claimed is:

1. A system comprising:
   at least one processor circuit; and
   at least one memory that stores program code configured to be executed by the at least one processor circuit, the program code comprising:
   a data manager configured to execute concurrently with a video game, the data manager comprising:
      a plugin manager configured to:
         identify a set of plugins coupled to the data manager, the set of plugins including a consumer plugin, a producer plugin, and a producer-consumer plugin, and
         identify a first event type to be reported to the consumer plugin and a second event type to be reported to the producer-consumer plugin; and
      an event reporting orchestrator configured to:
         receive a first notification of a first event from the producer-consumer plugin during execution of the video game;
         determine that the first event is of the first event type;
         in response to determining that the first event is of the first event type, provide first information associated with the first event to the consumer plugin;
         receive a second notification of a second event from the producer plugin during execution of the video game;
         determine that the second event is of the second event type; and
         in response to determining that the second event is of the second event type, provide second information associated with the second event to the producer-consumer plugin.

2. The system of claim 1, wherein the producer plugin comprises a game context engine and wherein the second information includes game context information generated based on an output of the video game during execution of the video game.

3. The system of claim 1, wherein the producer plugin comprises a system context engine and wherein the second information includes system context information of a computing device on which the data manager and the video game are executed.

4. The system of claim 1, wherein the plugin manager is configured to identify the first event type to be reported to the consumer plugin by:
   receiving, during a boot-up procedure of the data manager, a first event definition from the consumer plugin that defines at least the first event type and a first reporting schema of the first event type.

5. The system of claim 1, wherein the data manager exposes a common application programming interface (API) for receiving event definitions from consumer plugins and receiving event notifications from producer plugins.

6. The system of claim 1, wherein the program code comprises a content overlay engine configured to receive supplemental content from individual plugins and present the supplemental content during execution of the video game.

7. A method performed by a data manager of a content overlay engine that is executed with a video game, the method comprising:
   identifying a set of plugins coupled to the data manager, the set of plugins including a consumer plugin, a producer plugin, and a producer-consumer plugin;
   identifying a first event type to be reported to the consumer plugin and a second event type to be reported to the producer-consumer plugin;
   receiving a first notification of a first event from the producer-consumer plugin during execution of the video game;
   determining that the first event is of the first event type;
   in response to determining that the first event is of the first event type, providing first information associated with the first event to the consumer plugin;
   receiving a second notification of a second event from the producer plugin during execution of the video game;
   determining that the second event is of the second event type; and
   in response to determining that the second event is of the second event type, providing second information associated with the second event to the producer-consumer plugin.

8. The method of claim 7, wherein the producer plugin comprises a game context engine and wherein the second information includes game context information generated based on an output of the video game during execution thereof.

9. The method of claim 7, wherein the producer plugin comprises a system context engine and wherein the second information includes system context information of a computing device on which the data manager and the video game are executed.

10. The method of claim 7, wherein the identifying the first event type to be reported to the consumer plugin comprises:
    receiving, during a boot-up procedure of the data manager, a first event definition from the consumer plugin that defines at least the first event type and a first reporting schema of the first event type.

11. The method of claim 7, further comprising:
    exposing a common application programming interface (API) for receiving event definitions from consumer plugins and receiving event notifications from producer plugins.

12. The method of claim 7, further comprising:
    receiving, from the consumer plugin, supplemental content for presentation by the content overlay engine during execution of the video game.

13. The method of claim 7, the consumer plugin, the producer plugin, and the producer-consumer plugin executing locally on a computing device with the content overlay engine.

14. The method of claim 13, the video game executing on the computing device.

15. The method of claim 13, the video game executing remotely from the computing device on a cloud-based server.

16. A physical computer-readable storage medium having program instructions recorded thereon that, when executed by at least one processor of a computing device, cause the computing device to perform acts comprising:

identifying a set of plugins coupled to a data manager, the set of plugins including a consumer plugin, a producer plugin, and a producer-consumer plugin;

identifying a first event type to be reported to the consumer plugin and a second event type to be reported to the producer-consumer plugin;

receiving a first notification of a first event from the producer-consumer plugin during execution of a video game;

determining that the first event is of the first event type;

in response to determining that the first event is of the first event type, providing first information associated with the first event to the consumer plugin;

receiving a second notification of a second event from the producer plugin during execution of the video game;

determining that the second event is of the second event type; and in response to determining that the second event is of the second event type, providing second information associated with the second event to the producer-consumer plugin.

17. The physical computer-readable storage medium of claim 16, the acts further comprising:

receiving a first event definition from the consumer plugin that defines at least the first event type and a first reporting schema of the first event type; and receiving a second event definition from the producer-consumer plugin that defines at least the second event type and a second reporting schema of the second event type.

18. The physical computer-readable storage medium of claim 16, the producer-consumer plugin comprising a game engine, the first information reflecting analysis, by the game engine, of game-related data provided to the game engine via the second information.

19. The physical computer-readable storage medium of claim 18, the game-related data comprising image frames output by the video game.

20. The physical computer-readable storage medium of claim 19, the first information comprising game-related recommendations determinized by the game engine based at least on machine-learning analysis of the image frames output by the video game.

* * * * *